(12) United States Patent
Gunturi et al.

(10) Patent No.: US 12,696,245 B2
(45) Date of Patent: Jul. 28, 2026

(54) SYSTEM AND METHOD TO REDUCE PACKET ERROR RATES FOR LARGER FRAGMENTS THROUGH PAYLOAD NORMALIZATION

(71) Applicant: Silicon Laboratories Inc., Austin, TX (US)

(72) Inventors: Karthik Gunturi, Hyderabad (IN); Sunit Pujari, Hyderabad (IN); Ravikiran Nemali, Nizamabad (IN)

(73) Assignee: Silicon Laboratories Inc., Austin, TX (US)

( * ) Notice: Subject to any disclaimer, the term of this patent is extended or adjusted under 35 U.S.C. 154(b) by 551 days.

(21) Appl. No.: 18/127,189

(22) Filed: Mar. 28, 2023

(65) Prior Publication Data

US 2024/0334400 A1    Oct. 3, 2024

(51) Int. Cl.
*H04W 72/0446*      (2023.01)
*H04L 69/166*       (2022.01)
*H04W 4/80*         (2018.01)

(52) U.S. Cl.
CPC ....... *H04W 72/0446* (2013.01); *H04L 69/166* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,428,087 B1 * | 4/2013 | Vincent | H04L 47/2483 709/236 |
| 8,462,780 B2 * | 6/2013 | Vincent | H04L 45/64 370/392 |
| 9,215,283 B2 * | 12/2015 | Hampel | H04L 69/326 |
| 9,277,565 B2 * | 3/2016 | Ko | H04W 72/1215 |
| 9,559,800 B1 * | 1/2017 | Giles | H04J 13/18 |
| 9,755,893 B2 * | 9/2017 | Wang | H04L 41/0803 |

(Continued)

FOREIGN PATENT DOCUMENTS

WO    WO-2021093205 A1 *    5/2021    ......... H04L 1/1819

OTHER PUBLICATIONS

J. Nieminen et al., "Networking solutions for connecting bluetooth low energy enabled machines to the internet of things," in IEEE Network, vol. 28, No. 6, pp. 83-90, Nov.-Dec. 2014. (Year: 2014).*

(Continued)

*Primary Examiner* — Melvin H Pollack

(74) *Attorney, Agent, or Firm* — Nields, Lemack & Frame, LLC

(57)                ABSTRACT

A system and method for reducing packet error rates for L2CAP PDUs with large payloads is disclosed. The Bluetooth device fragments the large payload in several packets in accordance with well known algorithms. However, prior to transmission, the Bluetooth device redistributes the payload among these packets to reduce the maximum payload that is transmitted in one packet. In one embodiment, the Optimum Slot Utilization algorithm is used to determine the number and types of packets to be used, as well as the payloads in each packet. Once this is determined, the Bluetooth device then redistributes the payload across these packets to reduce the size of the largest payload that is transmitted in any packet, while still maintaining the same number of packets.

12 Claims, 4 Drawing Sheets

(56) References Cited

U.S. PATENT DOCUMENTS

| | | | | |
|---|---|---|---|---|
| 9,998,434 | B2 * | 6/2018 | Verzun | H04L 9/34 |
| 10,142,884 | B2 * | 11/2018 | Chauhan | H04W 28/065 |
| 10,297,927 | B2 * | 5/2019 | Amadjikpe | H01Q 21/22 |
| 10,362,503 | B2 * | 7/2019 | Mustajarvi | H04W 24/08 |
| 10,419,356 | B1 * | 9/2019 | Singh | H04L 47/365 |
| 10,530,571 | B2 * | 1/2020 | Moon | H04L 9/065 |
| 10,587,399 | B2 * | 3/2020 | Fernandez | G06F 21/6254 |
| 10,594,689 | B1 * | 3/2020 | Weaver | G06V 40/168 |
| 10,681,108 | B2 * | 6/2020 | Parron | H04L 69/22 |
| 10,750,360 | B2 * | 8/2020 | Morin | G06N 5/025 |
| 10,785,683 | B2 * | 9/2020 | Zaks | H04L 9/3242 |
| 10,873,533 | B1 * | 12/2020 | Ismailsheriff | H04L 47/2441 |
| 10,924,993 | B2 * | 2/2021 | Kneckt | H04W 52/0206 |
| 10,959,157 | B2 * | 3/2021 | Francisco | H04W 40/02 |
| 11,032,739 | B2 * | 6/2021 | Ly | H04W 28/06 |
| 11,042,477 | B2 * | 6/2021 | Simak | G06F 16/9024 |
| 11,166,137 | B2 * | 11/2021 | Zhao | H04L 47/365 |
| 11,263,158 | B2 * | 3/2022 | Galles | G06F 9/30101 |
| 11,375,578 | B2 * | 6/2022 | Batra | H04W 84/20 |
| 11,553,343 | B2 * | 1/2023 | Agarwal | H04L 5/0055 |
| 11,627,639 | B2 * | 4/2023 | Verzun | H04W 28/12 713/154 |
| 11,659,531 | B2 * | 5/2023 | Lei | H04L 1/1896 370/329 |
| 11,736,405 | B2 * | 8/2023 | Gilson | H04L 41/083 |
| 11,836,385 | B2 * | 12/2023 | Foo | G06F 3/067 |
| 11,902,805 | B2 * | 2/2024 | Li | H04L 41/40 |
| 11,956,720 | B2 * | 4/2024 | Ramappa | H04W 52/0209 |
| 12,014,316 | B2 * | 6/2024 | Ma | G06F 16/2237 |
| 12,015,916 | B2 * | 6/2024 | Hammerschmidt | H04W 12/0431 |
| 12,035,266 | B2 * | 7/2024 | Ly-Gagnon | H04W 56/0015 |
| 12,119,673 | B2 * | 10/2024 | Kim | H04W 12/00 |
| 12,127,140 | B2 * | 10/2024 | Lee | H04J 3/067 |
| 12,184,520 | B2 * | 12/2024 | Foo | H04L 43/04 |
| 12,184,554 | B2 * | 12/2024 | Zhu | H04L 47/24 |
| 12,189,658 | B2 * | 1/2025 | Palukuri | G06F 16/22 |
| 12,192,101 | B2 * | 1/2025 | Pei | H04L 69/04 |
| 12,309,070 | B2 * | 5/2025 | Klenk | H04L 47/2441 |
| 12,342,393 | B2 * | 6/2025 | Lee | H02J 50/80 |
| 12,349,031 | B2 * | 7/2025 | Lee | H04L 65/762 |
| 12,349,089 | B2 * | 7/2025 | Linsky | H04W 24/08 |
| 12,438,959 | B2 * | 10/2025 | Foo | G06F 11/1004 |
| 12,457,279 | B2 * | 10/2025 | Takahashi | H04L 69/22 |
| 2016/0066212 | A1 * | 3/2016 | Visweswara | H04W 48/00 370/474 |
| 2018/0234525 | A1 * | 8/2018 | Deshpande | H04L 47/36 |
| 2019/0239140 | A1 * | 8/2019 | Arickan | H04W 40/16 |
| 2019/0334907 | A1 * | 10/2019 | Rodden | G06Q 10/063116 |
| 2021/0092058 | A1 * | 3/2021 | Popilov | H04L 45/566 |
| 2024/0089715 | A1 * | 3/2024 | Haggai | H04W 56/001 |
| 2024/0146829 | A1 * | 5/2024 | Kim | H04L 69/24 |
| 2024/0235984 | A1 * | 7/2024 | Chunduri | H04L 45/302 |
| 2024/0259245 | A1 * | 8/2024 | Shin | H04L 27/2607 |
| 2024/0396849 | A1 * | 11/2024 | Lee | H04L 12/40 |
| 2024/0397399 | A1 * | 11/2024 | Gupta | H04W 36/322 |
| 2025/0056429 | A1 * | 2/2025 | Yingchao | H04W 52/245 |
| 2025/0106905 | A1 * | 3/2025 | Hirsch | H04W 24/02 |
| 2025/0151136 | A1 * | 5/2025 | Kuppa | H04W 76/14 |

OTHER PUBLICATIONS

M. A. Ayoub and A. M. Eltawil, "Throughput Characterization for Bluetooth Low Energy with Applications in Body Area Networks," 2020 IEEE International Symposium on Circuits and Systems (ISCAS), Seville, Spain, 2020, pp. 1-4. (Year: 2020).*

Moron, M.J., Luque, R., Casilari, E. et al. Overhead and Segmentation Mismatch Effect on Bluetooth WPAN Performance. Wireless Pers Commun 50, 161-180 (2009). (Year: 2009).*

Das et al., Enhancing Performance of Asynchronous Data Traffic over the Bluetooth Wireless Ad-hoc Network. IEEE INFOCOM, Jan. 2002.

* cited by examiner

SYSTEM AND METHOD TO REDUCE PACKET ERROR RATES FOR LARGER FRAGMENTS THROUGH PAYLOAD NORMALIZATION

FIELD

This disclosure describes systems and methods to reduce packet errors rates for larger fragments by normalizing the size of the payloads in the various packets.

BACKGROUND

Bluetooth is one of many wireless networks that are gaining popularity in the 2.4 GHz frequency band. The proliferation of networks, especially in the 2.4 GHz frequency band, has led to challenges for those attempting to utilize multiple network protocols. For example, ZigBee, Bluetooth Low Energy (BLE) and WiFi all operate in the 2.4 GHz spectrum. Consequently, these various protocols may interfere with one another, resulting in reductions in throughput or data loss.

This problem may be exacerbated by longer packets, since the packet error rate is related to the length of the packets. Bluetooth utilizes the concept of a slot, where packets are fragmented to fit within one or more slots. The following table, Table 1, shows the various packet types that are defined by the Bluetooth specification. The table also shows the size of the payload associated with each packet type. In this table, "DM" refers to packets that include a forward error correction (FEC) code, while "DH" refers to packets that do not have a FEC. Further, the trailing number indicates the number of slots that the packet type requires. The leading number refers to the data rate (in Mbps) of the packet. Thus, for example, 2-DH5 is a packet that does not include a FEC, is transmitted at 2 Mbps and occupies 5 slots, DM3 is a packet that includes a FEC, is transmitted at 1 Mbps and occupies 3 slots, and 3-DH1 is a packet that does not include a FEC, is transmitted at 3 Mbps and occupies 1 slot.

TABLE 1

| Packet Type | User Payload (Bytes) |
| --- | --- |
| DM1 | 0-17 |
| DH1 | 0-27 |
| DM3 | 0-121 |
| DH3 | 0-183 |
| DM5 | 0-224 |
| DH5 | 0-339 |
| 2-DH1 | 0-54 |
| 2-DH3 | 0-367 |
| 2-DH5 | 0-679 |
| 3-DH1 | 0-83 |
| 3-DH3 | 0-552 |
| 3-DH5 | 0-1021 |

Thus, when a Logical Link Control and Adaptation Layer Protocol (L2CAP) Protocol Data Unit (PDU) contains a payload having a byte count that is greater than the maximum allowed in a single packet is to be transmitted, the sending device must fragment that L2CAP PDU into two or more packets. Various algorithms are known that may be used to achieve this fragmentation. One algorithm is referred to as the Best Fit algorithm, which attempts to maximize the utilization of the packets that are transmitted. For example, a payload of 830 bytes that is to be transmitted at 2 Mbps, would be fragmented into one 2-DH5 packet and 3 2-DH1 packets, where all of the packets are fully utilized except the last 2-DH1 packet, which only contains 43 bytes. A second algorithm is referred to as the Optimum Slot Utilization algorithm. This algorithm attempts to minimize the number of packets that are being transmitted. For example, using the OSU algorithm, the 830 byte payload would be fragmented into one 2-DH5 packet and one 2-DH3 packet, wherein the second packet has only 151 bytes. Thus, fewer packets are used in the OSU algorithm.

However, as noted above, larger packets tend to have a higher packet error rate. Therefore, it would be beneficial if there were a system and method that allowed Bluetooth devices to transfer large payloads in an efficient manner, but also reduced the packet error rate associated with these large payloads.

SUMMARY

A system and method for reducing packet error rates for L2CAP PDUs with large payloads is disclosed. The Bluetooth device fragments the large payload in several packets in accordance with well known algorithms fragmentation algorithms. However, prior to transmission, the Bluetooth device then redistributes the payload among these packets to reduce the maximum payload that is transmitted in one packet. In one embodiment, the Optimum Slot Utilization algorithm is used to determine the number and types of packets to be used, as well as the payloads in each packet. Once this is determined, the Bluetooth device then redistributes the payload across these packets to reduce the size of the largest payload that is transmitted in any packet, while still maintaining the same number of packets.

According to one embodiment, a method of transmitting a Logical Link Control and Adaptation Layer Protocol (L2CAP) Protocol Data Unit (PDU) having a large payload from a Bluetooth network device to a remote device using a plurality of packets is disclosed. The method comprises separating the large payload into a plurality of packets using a fragmentation algorithm, wherein an output of the fragmentation algorithm comprises one packet type that is to be utilized by all of the plurality of packets, wherein the one packet type has a maximum byte count, and a number of packets of the one packet type; redistributing the data among the plurality of packets such that a maximum number of bytes transmitted in each packet is less than the maximum byte count allowed by the one packet type; and transmitting the plurality of packets to the remote device after the redistributing. In some embodiments, the fragmentation algorithm comprises an Optimal Slot Utilization algorithm. In some embodiments, the fragmentation algorithm comprises a Best Fit algorithm. In some embodiments, the large payload is separated into a minimum number of packets. In some embodiments, the large payload is divided evenly among the plurality of packets.

According to another embodiment, a method of transmitting a Logical Link Control and Adaptation Layer Protocol (L2CAP) Protocol Data Unit (PDU) having a large payload from a Bluetooth network device to a remote device using a plurality of packets is disclosed. The method comprises separating the large payload into a plurality of packets using a fragmentation algorithm, wherein an output of the fragmentation algorithm comprises two or more packet types that are to be utilized, wherein each packet type has a maximum byte count, and a number of packets of each packet type; redistributing the data among the plurality of packets such that a packet having a smaller maximum byte count has a payload having its maximum byte count and at least one packet having a larger maximum byte count has a payload having less than its maximum byte count; and transmitting the plurality of packets to the remote some embodiments, the device after the redistributing fragmentation algorithm comprises an Optimal Slot Utilization algorithm. In some embodiments, the fragmentation algorithm comprises a Best Fit algorithm. In some embodiments, a last of the plurality of packets has the smaller maximum byte count and a first of the plurality of packets has the larger maximum byte count, and wherein bytes are added to the last of the plurality of packets such that the payload of the last of the plurality of packets has its maximum byte count; and an equal number of bytes are subtracted from the payload of the first of the plurality of packets. In certain embodiments, at least one additional packet of the plurality of packets has a same maximum byte count as the first of the plurality of packets; and the payload contained within all packets having the same maximum byte count as the first of the plurality of packets is evenly distributed.

According to another embodiment, a Bluetooth network device for transmitting a Logical Link Control and Adaptation Layer Protocol (L2CAP) Protocol Data Unit (PDU) having a large payload to a remote device using a plurality of packets is disclosed. The Bluetooth network device comprises a Bluetooth network interface; a processing unit; and a memory device comprising instructions, which when executed by the processing unit, enable the Bluetooth network device to: separate the large payload into a plurality of packets using a fragmentation algorithm, wherein an output of the fragmentation algorithm comprises one or more packet types that are to be utilized, wherein each packet type has a maximum byte count, and a number of packets of each packet type; redistribute the large payload among the plurality of packets such that a maximum byte count transmitted by any of the plurality of packets is less than the maximum byte count as determined by the fragmentation algorithm; and transmit the plurality of packets to the remote device using the Bluetooth network interface after the redistributing. In some embodiments, the fragmentation algorithm comprises a Best Fit algorithm. In some embodiments, the large payload is separated into a minimum number of packets. In some embodiments, the large payload is divided evenly among the plurality of packets. In some embodiments, all of the plurality of packets comprise a same maximum byte count, and the large payload is divided evenly among the plurality of packets. In some embodiments, a last of the plurality of packets has a smaller maximum byte count than a first of the plurality of packets, and bytes are added to the last of the plurality of packets such that the last of the plurality of packets has its maximum byte count; and an equal number of bytes are subtracted from the first of the plurality of packets. In certain embodiments, at least one additional packet of the plurality of packets has a same maximum byte count as the first of the plurality of packets; and wherein the large payload contained within all packets having the same maximum byte count as the first of the plurality of packets is evenly distributed.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
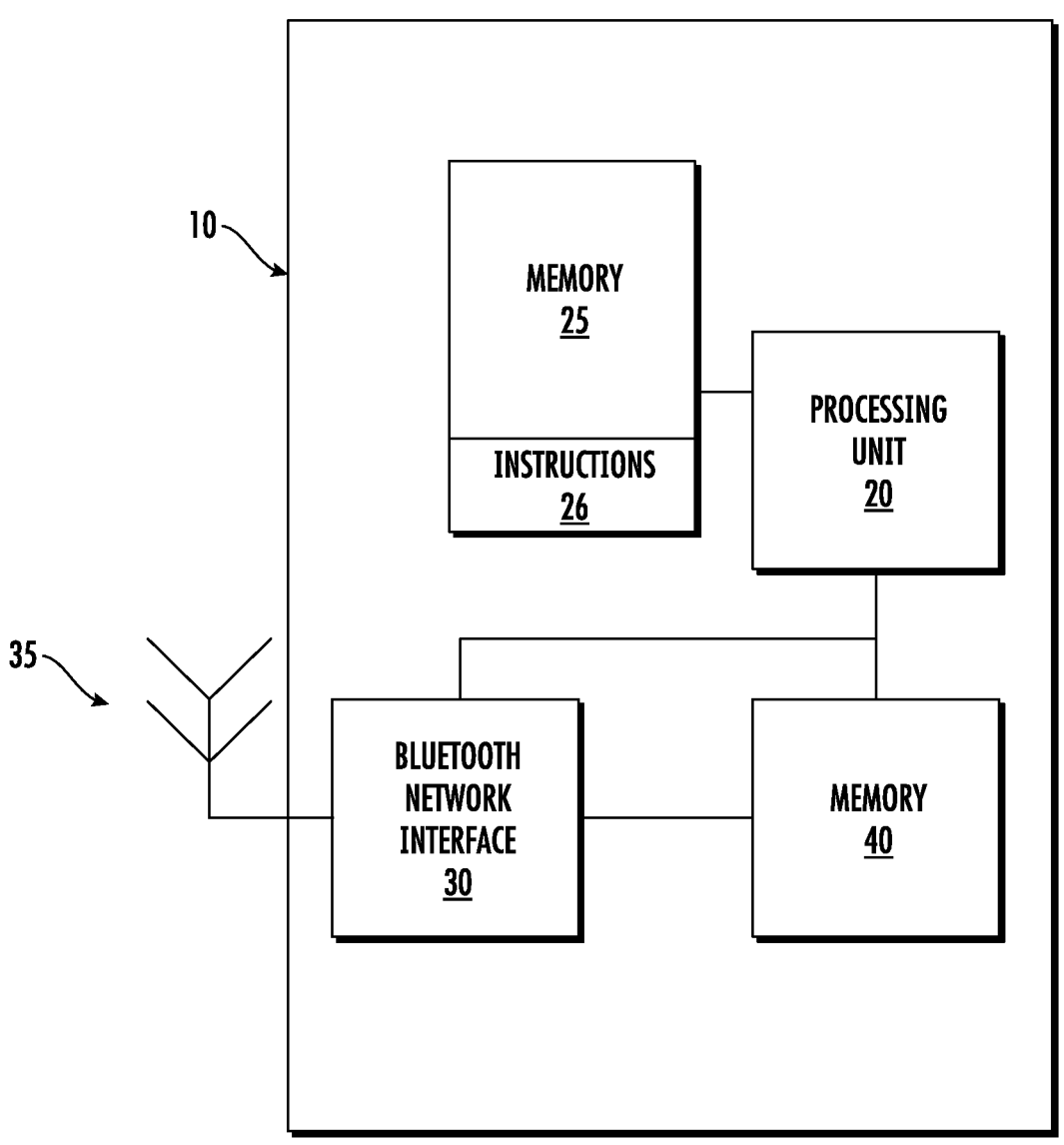
FIG. 1 is a block diagram of the Bluetooth network device.

FIG. 1 shows a block diagram of a representative Bluetooth network device 10 that minimizes the maximum payload size of a Bluetooth packet according to one embodiment.

The Bluetooth network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Bluetooth network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the Bluetooth network device 10. The instructions contained on this second computer readable non-transitory media may be downloaded onto the memory device 25 to allow execution of the instructions by the Bluetooth network device 10.

The Bluetooth network device 10 also includes a Bluetooth network interface 30, which may be a wireless interface that connects with an antenna 35. The Bluetooth network interface 30 supports the Bluetooth network protocol.

The Bluetooth network device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other nodes in the wireless Bluetooth network. Although not shown, the Bluetooth network device 10 also has a power supply, which may be a battery or a connection to a permanent power source, such as a wall outlet.

While the processing unit 20, the memory device 25, the Bluetooth network interface 30, and the second memory device 40 are shown in FIG. 1 as separate components, it is understood that some or all of these components may be integrated into a single electronic component. Rather, FIG. 1 is used to illustrate the functionality of the Bluetooth network device 10, not its physical configuration.

Before describing the operation of the Bluetooth network device, a brief overview of the Bluetooth slot technique is provided. The Bluetooth specification uses the concepts of slots, wherein packets are transmitted within a predetermined number of slots. To optimize bandwidth, the Bluetooth specification recognizes that different slot sizes may be advantageous. Therefore, it defines three different slot sizes, known as 1-slot, 3-slot and 5-slot. As the name indicates, the 3-slot is three times the duration of a 1-slot, and the 5-slot is five times the duration of the 1-slot. Different devices may have different capabilities. Therefore, devices may negotiate with each other to determine the largest slot size that each device may accommodate. Once this is determined, all communications between those two devices adhere to the negotiated maximum slot size.

Figure 2:
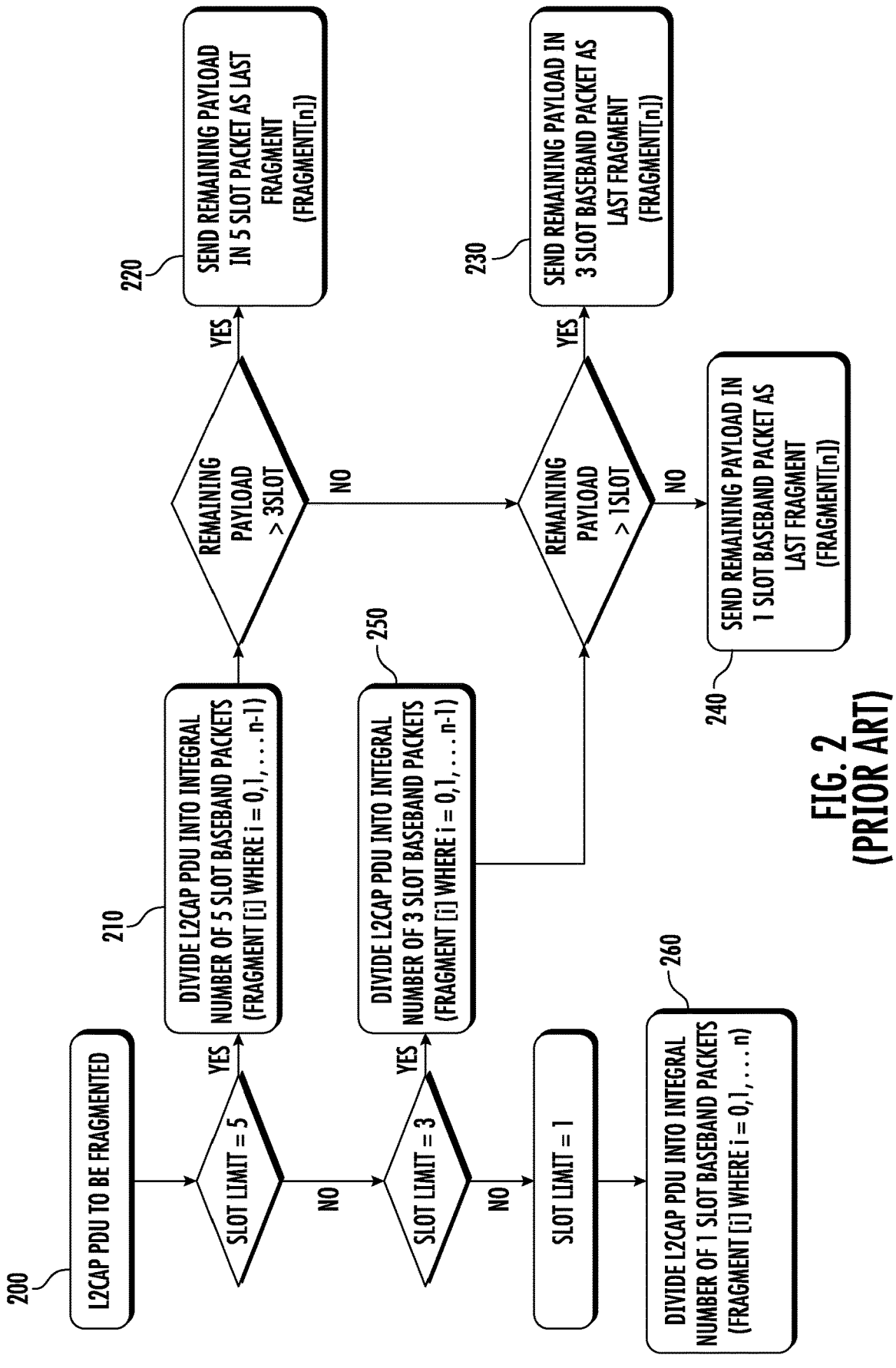
FIG. 2 is a flowchart showing the operation of the Bluetooth network device to determine the number and type of packets needed to transmit a L2CAP PDU according to one embodiment.

As described above, L2CAP PDUs with large payloads are fragmented into a plurality of packets. In this disclosure, the term "large payload" is used to denote any payload that cannot be transmitted in a single packet. One flowchart illustrating how the Bluetooth network device performs this fragmentation is shown in FIG. 2. This flowchart illustrates the operation of the Optimum Slot Utilization (OSU) algorithm.

First, the L2CAP PDU is prepared for transmission, as shown in Box 200. The L2CAP PDU has a large payload having a certain number of bytes that cannot be transmitted in a single packet. If both devices support 5-slot limits, the Bluetooth device creates a plurality of 5-slot packets, based on the size of the payload, as shown in Box 210. Specifically, the number of 5-slot packets is first defined as the integer portion of the quotient of (payload size) divided by (number of bytes in 5-slot packet). Note that, as shown in Table 1, the number of bytes in a 5-slot packet is determined by the desired data rate. Thus, for example, for a 2 Mbps transmission rate, the number of 5-slot packets is defined as the integer portion of the quotient of (payload) divided by 679. The number of bytes that are contained in these 5-slot packets are then subtracted from the payload to yield the remaining payload.

If the remaining payload is larger than the size of a 3-slot packet, the remaining payload is placed in another 5-slot packet, as shown in Box 220.

If, however, the remaining payload is smaller than the size of a 3-slot packet, the Bluetooth network device checks whether the remaining payload is larger than a 1-slot packet. If so, the remaining payload is placed in a 3-slot packet, as shown in Box 230. If the remaining payload is smaller than the size of a 1-slot packet, the remaining payload is placed in a 1-slot packet, as shown in Box 240.

This describes the sequence if 5-slot packets are allowed. If 3-slot packets are the largest packets that are allowed, the sequence is somewhat different. First, as shown in Box 250, a number of 3-slot packets are created, based on the payload size and the transmission rate. The number of 3-slot packets is defined as the integer portion of the quotient of (payload) divided by (number of bytes in 3-slot packet). Note that, as shown in Table 1, the number of bytes in a 3-slot packet is determined by the desired data rate. Thus, for example, for a 2 Mbps transmission rate, the number of 3-slot packets may be defined as the integer portion of the quotient of (payload) divided by 367. The number of bytes that are contained in these 3-slot packets are then subtracted from the payload to yield the remaining payload. If the remaining payload is larger than a 1-slot packet, the remaining payload is placed in a 3-slot packet, as shown in Box 230. If the remaining payload is smaller than the size of a 1-slot packet, the remaining payload is placed in a 1-slot packet, as shown in Box 240.

Finally, if only 1-slot packets are allowed, as shown in Box 260, the Bluetooth network device creates a number of 1-slot packets, where the number of 1-slot packets is determined based on payload size and the transmission rate, as explained above. If the payload is not divisible by the maximum byte count of a 1-slot packet, one additional partially filled 1-slot packet is added.

The new fragmentation sequence presented herein is similar to that defined in existing fragmentation algorithms, such as the OSU algorithm. However, in the present disclosure, the OSU algorithm does not determine the final configuration of the packets. Specifically, the OSU algorithm is used to determine the number and types of packets that are to be used to transmit the L2CAP PDU. Of course, other algorithms may be used to determine the number and the types of packets that are to be used.

Once the number and types of packets have been determined, the Bluetooth network device 10 then attempts to reduce the packet error rate by redistributing the payload among the packets.

Figure 3:
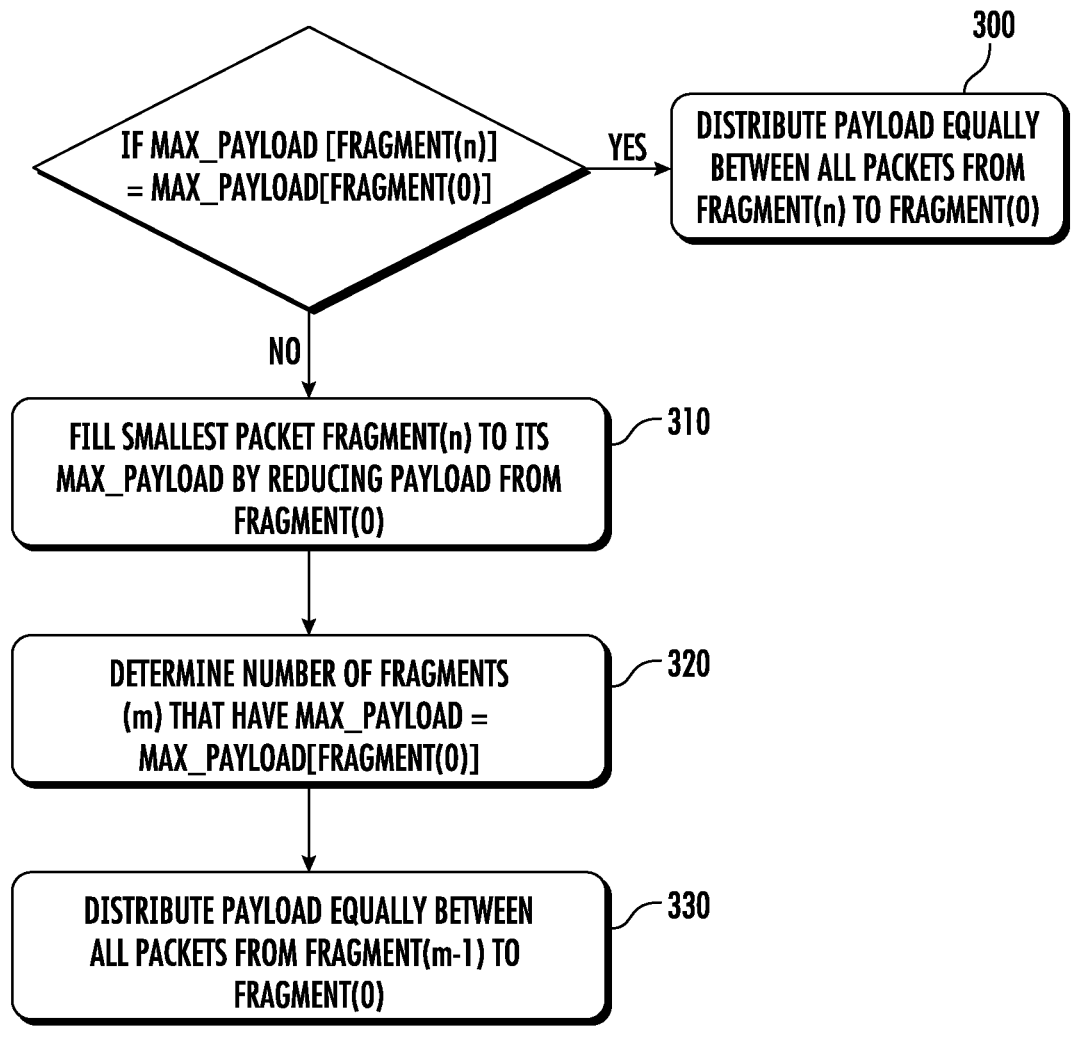
FIG. 3 is a flowchart showing a technique for reducing packet error rate according to one embodiment.

FIG. 3 illustrates a flowchart that may be used to optimize the distribution of the bytes across the various packets. First, the Bluetooth network device determines whether all of the packets are the same size (such as all 5-slot, all 3-slot, or all 1-slot). This is done by comparing the maximum payload size of the first fragment to the maximum payload size of the last fragment. If all the packets are the same number of slots, the Bluetooth network device then redistributes the total payload among all of the packets. Specifically, the number of bytes in each packet may be roughly equal to the total payload divided by the number of packets. For example, assume that the payload is to be transmitted at 2 Mbps, and contains 500 bytes. Using the OSU algorithm, this payload has been divided into two 2-DH3 packets, where the first fragment has 367 bytes, and the second fragment has the remaining 133 bytes. Using the approach shown in Box 300, the data is redistributed such that both 2-DH3 packets contain 250 bytes. In other words, the number of bytes is divided evenly between the number of packets. In this disclosure, "divided evenly" is used to indicates that all payloads have the same number of bytes, or are within 1 of having the same number of bytes (in cases where the payload is not evenly divisible by the number of packets).

If, however, different size packets are used, the Bluetooth network device then fills the smallest packet completely, as shown in Box 310. This is done by reducing the number of bytes in the first fragment and increasing the number of bytes in the last fragment until the last fragment is at the maximum size allowed by that packet type. For example, assume that the payload is to be transmitted at 2 Mbps, contains 400 bytes and has been divided into a 2-DH3 packet and a 2-DH1 packet, where the 2-DH3 packet has 367 bytes, and the 2-DH1 packet has the remaining 33 bytes. Using the approach shown in Box 310, the data is redistributed such that the 2-DH1 packet has 54 bytes, and the payload of the 2-DH3 packet has been reduced to 346 bytes. Further, as shown in Box 320, the Bluetooth network device then checks how many packets have the largest number of slots. For example, for a payload that is to be transmitted at 2 Mbps and contains more than 1358 bytes, there will be at least two 2-DH5 packets. Based on the number of packets that have the largest number of slots, the data bytes in these packets may then be redistributed, as shown in Box 330. Table 2 below shows the operation of the Bluetooth network device for various sized packets. In each example, it is assumed that the packets are to be transmitted at a rate of 2 Mbps. The rows labelled "OSU" describes the result after the sequence shown in FIG. 2 is executed. The rows labelled "Box 300" show the result after the operation described in Box 300 is performed. Similarly, the rows labelled "Box 310" and "Box 330" show the result after the operation described in Box 310, and Box 330 is executed, respectively.

| Payload | | 2-DH1 (0-54) | 2-DH3 (0-367) | 2-DH5 (0-679) |
|---|---|---|---|---|
| 830 | OSU | 0 | 1 (151) | 1 (679) |
| | Box 310 | 0 | 1 (367) | 1 (463) |
| 1100 | OSU | 0 | 0 | 1 (679) + 1 (421) |
| | Box 300 | 0 | 0 | 1 (550) + 1 (550) |
| 1500 | OSU | 0 | 1 (142) | 1 (679) + 1 (679) |
| | Box 310 | 0 | 1 (367) | 1 (454) + 1 (679) |
| | Box 330 | 0 | 1 (367) | 1 (567) + 1 (566) |
| 2100 | OSU | 0 | 1 (63) | 1 (679) + 1 (679) + 1 (679) |
| | Box 310 | 0 | 1 (367) | 1 (375) + 1 (679) + 1 (679) |
| | Box 330 | 0 | 1 (367) | 1 (578) + 1 (578) + 1 (577) |

Note that while the above table and description assumes the use of OSU algorithm, it is understood that the sequence shown in FIG. 3 may be applied to any fragmentation algorithm used to fragment a L2CAP PDU. Rather, the input to the flowchart of FIG. 3 is simply the number of packets of each type, and the number of bytes in each of those packets, as determined by a fragmentation algorithm. The Bluetooth network device then performs the operations shown in FIG. 3 to reduce the packet error rate, while maintaining the number of packets originally determined by the fragmentation algorithm.

Note that in each of these examples, the maximum byte count transmitted by the plurality of packets is reduced as compared to the maximum byte count as determined by the fragmentation algorithm. In the case of a payload of 830 bytes, the maximum byte count in any of the packets was reduced from 679 bytes to 463 bytes. In the case of a payload of 1100 bytes, the maximum byte count in any of the packets was reduced from 679 bytes to 550 bytes. In the case of a payload of 1500 bytes, the maximum byte count in any of the packets was reduced from 679 bytes to 567 bytes. In the case of a payload of 2100 bytes, the maximum byte count in any of the packets was reduced from 679 bytes to 578 bytes.

Additionally, the examples above show the payload being redistributed equally among packets having the same size. In some embodiments, the final byte count for each packet may not be equal. For example, the remaining payload may not be divisible by the number of packets. Alternatively, there may be other considerations that would result in the packets not having the exact same size payload.

Figures 4A, 4B:
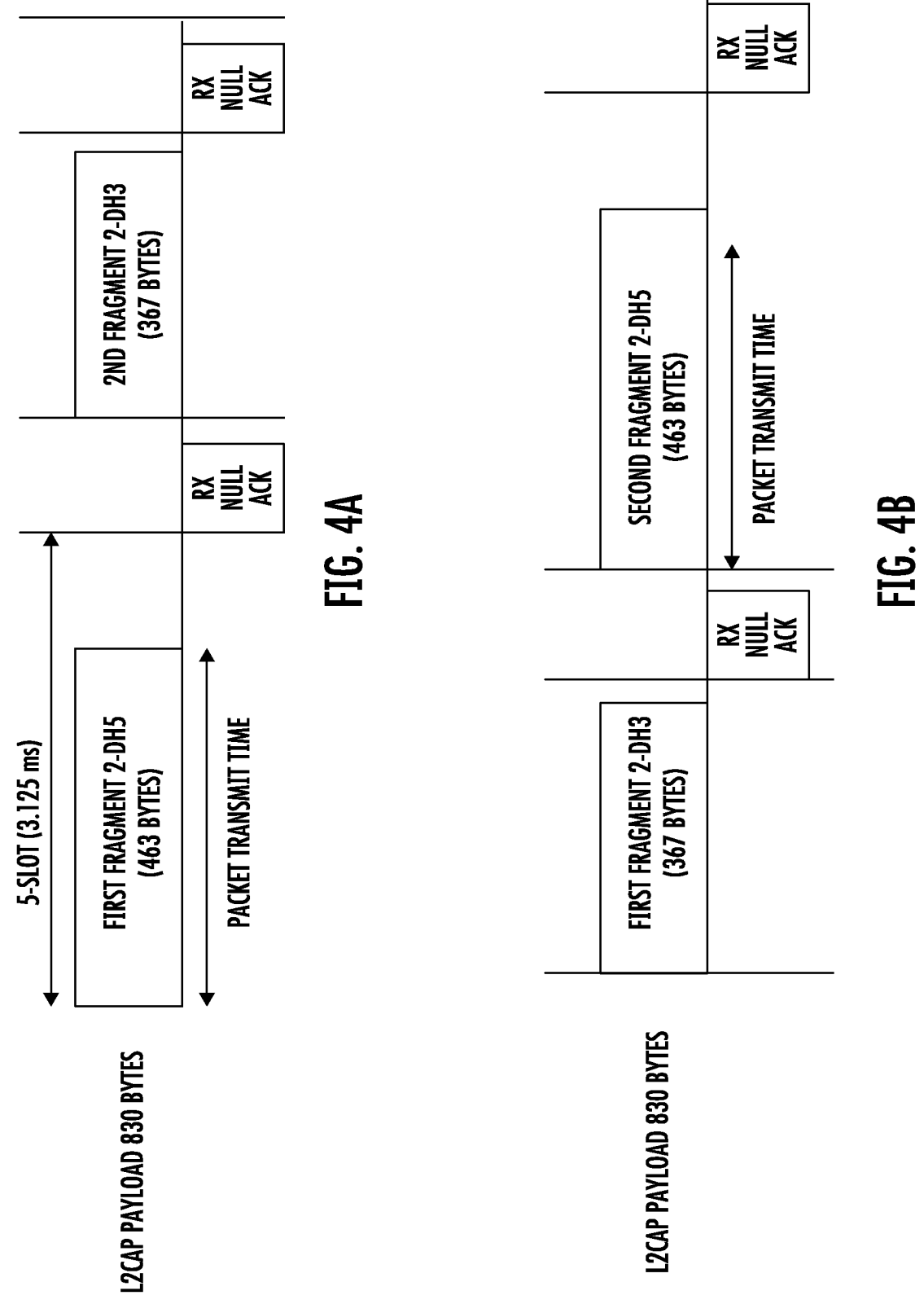
FIGS. 4A-4B show two embodiments for the transmission of multiple packets.

It is possible that some Bluetooth devices may expect that only the last packet contains less than the maximum payload. Therefore, in some embodiments, the Bluetooth device may rearrange the order of the packets to ensure that the first packet has the maximum payload. FIG. 4A shows a timing diagram showing the transmission of two packets that contain a total payload of 830 bytes. As described above, this payload will be divided into a 2-DH5 packet and a 2-DH3 packet, where the 2-DH3 packet contains its maximum byte count, and the 2-DH5 packet contains less than its maximum byte count. Note that, in this transmission, the partially filled packet (i.e., the 2-DH5 packet) is transmitted first. As noted above, in certain embodiments, certain Bluetooth receivers may expect this to be the last packet, since it is not completely filled. Thus, in one embodiment, shown in FIG. 4B, as an alternative, the Bluetooth device reverses the order of the two packets such that the completely filled 2-DH3 packet is transmitted first, followed by the partially filled 2-DH5 packet.

The system and method have many advantages. The packet error rate is related to the length of the packet. By reducing the maximum packet size, the packet error rate may be reduced. Further, by combining the present method with the OSU algorithm, the packet error rate may be reduced while simultaneously minimizing the total number of packets that are transmitted.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of transmitting a Logical Link Control and Adaptation Layer Protocol (L2CAP) Protocol Data Unit (PDU) having a large payload from a Bluetooth network device to a remote device using a plurality of packets, comprising:

separating the large payload into a plurality of packets using a fragmentation algorithm, wherein an output of the fragmentation algorithm comprises two or more packet types that are to be utilized, wherein each packet type has a different maximum byte count, and a number of packets of each packet type;

redistributing the data among the plurality of packets such that a packet having a smaller maximum byte count has a payload having its maximum byte count and at least one packet having a larger maximum byte count has a payload having less than its maximum byte count; and transmitting the plurality of packets to the remote device after the redistributing.

2. The method of claim 1, wherein the fragmentation algorithm comprises an Optimal Slot Utilization algorithm.

3. The method of claim 1, wherein the fragmentation algorithm comprises a Best Fit algorithm.

4. The method of claim 1, wherein a last of the plurality of packets has the smaller maximum byte count and a first of the plurality of packets has the larger maximum byte count, and wherein bytes are added to the last of the plurality of packets such that the payload of the last of the plurality of packets has its maximum byte count; and an equal number of bytes are subtracted from the payload of the first of the plurality of packets.

5. The method of claim 1, wherein a last of the plurality of packets has the smaller maximum byte count and a first of the plurality of packets has the larger maximum byte count, and wherein at least one additional packet of the plurality of packets has a same maximum byte count as the first of the plurality of packets; wherein bytes are added to the last of the plurality of packets such that the payload of the last of the plurality of packets has its maximum byte count; and wherein the payload contained within all packets having the same maximum byte count as the first of the plurality of packets is evenly distributed.

6. A Bluetooth network device for transmitting a Logical Link Control and Adaptation Layer Protocol (L2CAP) Protocol Data Unit (PDU) having a large payload to a remote device using a plurality of packets, comprising:

a Bluetooth network interface;

a processing unit; and a memory device comprising instructions, which when executed by the processing unit, enable the Bluetooth network device to:

separate the large payload into a plurality of packets using a fragmentation algorithm, wherein an output of the fragmentation algorithm comprises one or more packet types that are to be utilized, wherein each packet type has a different maximum byte count, and a number of packets of each packet type;

redistribute the large payload among the plurality of packets such that a maximum byte count transmitted by at least one of the plurality of packets is less than the maximum byte count as determined by the fragmentation algorithm; and transmit the plurality of packets to the remote device using the Bluetooth network interface after the redistributing.

7. The Bluetooth network device of claim 6, wherein fragmentation algorithm comprises an Optimal Slot Utilization algorithm.

8. The Bluetooth network device of claim 6, wherein the fragmentation algorithm comprises a Best Fit algorithm.

9. The Bluetooth network device of claim 6, wherein the large payload is separated into a minimum number of packets.

10. The Bluetooth network device of claim 6, wherein all of the plurality of packets comprise a same maximum byte count, and the large payload is divided evenly among the plurality of packets.

11. The Bluetooth network device of claim 6, wherein a last of the plurality of packets has a smaller maximum byte count than a first of the plurality of packets, and wherein bytes are added to the last of the plurality of packets such that the last of the plurality of packets has its maximum byte count; and an equal number of bytes are subtracted from the first of the plurality of packets.

12. The Bluetooth network device of claim 6, wherein a last of the plurality of packets has a smaller maximum byte count than a first of the plurality of packets, and wherein at least one additional packet of the plurality of packets has a same maximum byte count as the first of the plurality of packets; wherein bytes are added to the last of the plurality of packets such that the last of the plurality of packets has its maximum byte count; and wherein the large payload contained within all packets having the same maximum byte count as the first of the plurality of packets is evenly distributed.

* * * * *